Dec. 9, 1969   S. P. HANSEN ET AL   3,482,695
PACKAGE WATER TREATMENT PLANT
Filed March 16, 1967   2 Sheets-Sheet 1

SIGURD P. HANSEN
CHARLES W. BOTSFORD
ARCHIE H. RICE
WALTER R. CONLEY, JR.
INVENTORS
BY
BUCKHORN, BLORE, KLARQUIST & SPARKMAN
ATTORNEYS

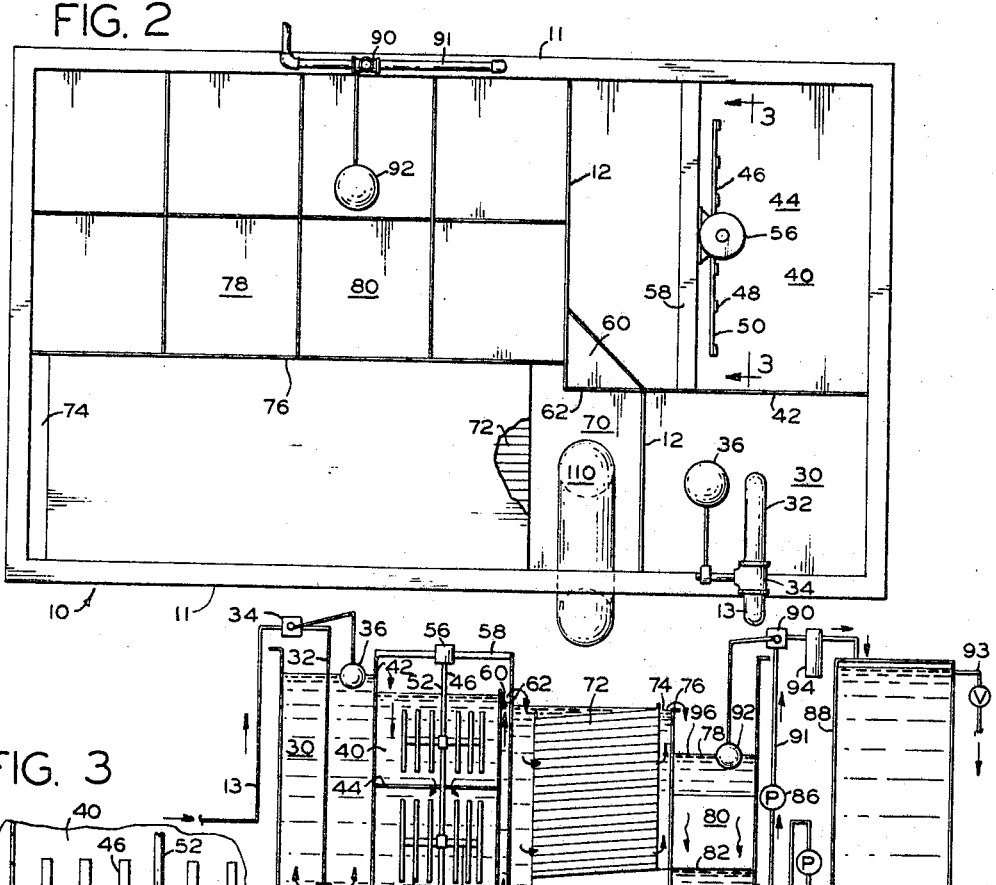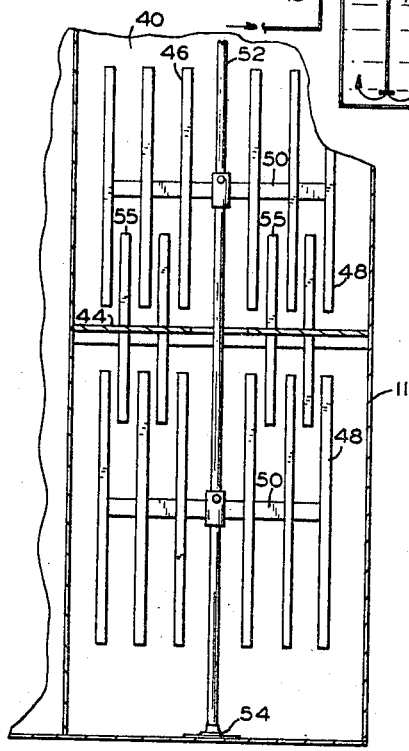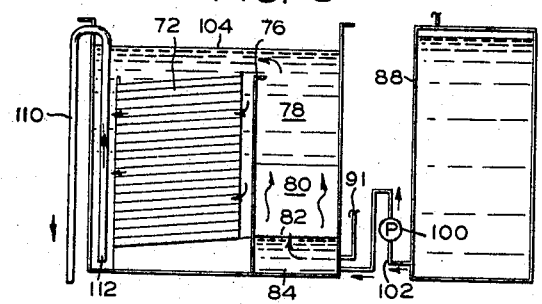

United States Patent Office 3,482,695
Patented Dec. 9, 1969

3,482,695
PACKAGE WATER TREATMENT PLANT
Sigurd P. Hansen, Charles W. Botsford, Archie H. Rice, and Walter R. Conley, Jr., Corvallis, Oreg., assignors to Neptune Microfloc Incorporated, Corvallis, Oreg., a corporation of Oregon
Filed Mar. 16, 1967, Ser. No. 623,772
Int. Cl. B01d 21/01
U.S. Cl. 210—86     11 Claims

ABSTRACT OF THE DISCLOSURE

A package water treatment plant having means automatically to adjust the alkalinity of the water and agitating means to form a floc. A settling means comprising a plurality of small diameter tubes is provided to permit settling of settleable material in a short period of time before passing the treated water through a filter. Controls and a system are provided for automatically backwashing the filter and settling means as need therefor arises.

BACKGROUND OF THE INVENTION

Figure 1:
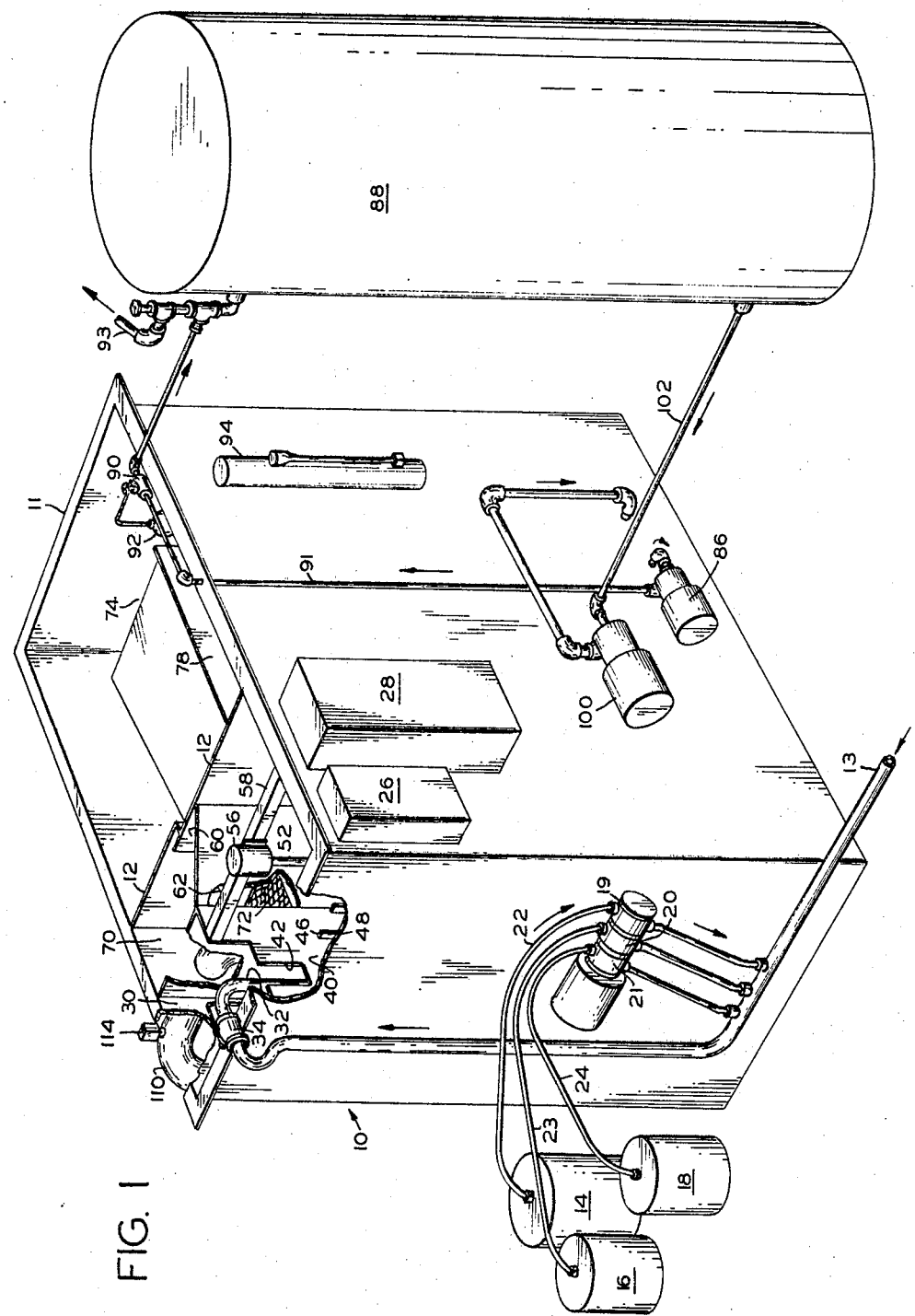

The present invention pertains to the field of small, compact, integrated water treatment plants for small communities, motels, recreational areas and the like which can be operated with a minimum of operator control and yet provide potable water of high clarity on a fail-safe basis.

Obtaining pure water in adequate quantities and at an acceptable cost has become a considerable problem for our rapidly expanding population. Providing increasing volumes of water is thus requiring the use of raw water sources previously judged to be undesirable. As a result, a considerable percentage of the population, principally in small communities, is presently consuming water of questionable purity. In many localities people are obliged to consume water which at certain times of the year does not meet the United States Public Heath Service standards for drinking water. Occasional instances of water borne epidemics indicate that existing facilities or processes used in small scale water treatment plants are incapable of meeting high potable water standards when treating raw waters of deteriorated quality. Those package water treatment plants that are presently available do not provide the assurance that treated water will meet high clarity standards continuously during unfavorable raw water conditions. Specifically, much of their effluent contains unacceptable amounts of suspended material and/or turbidity, which in filtered waters can shelter significant numbers of bacteria. It has been found that there is a close correlation between bacteria count and turbidity residuals in filtered water. Reduction of turbidity is, therefore, highly important.

SUMMARY OF THE INVENTION

The present invention comprises a water treatment plant integrated into a compact package. The plant comprises means to achieve rapid coagulant chemical dispersion, automatic pH control, mechanical flocculation, high rate settling means, filter means and the necessary plant and process controls. A tank is provided for receiving the filtered water and means are provided automatically to pump water from the tank back through the filter and settling means when backwashing becomes necessary, thereby simultaneously to backwash the two.

THE DRAWINGS

FIG. 1 is an isometric view, with parts broken away, of a water treatment plant constructed in accordance with the present invention;
FIG. 2 is a plan view of the water treatment plant shown in FIG. 1;
FIG. 3 is a section taken on line 3—3 of FIG. 2;
FIG. 4 is a schematic flow diagram through the water treatment plant of the present invention while it is treating raw water; and
FIG. 5 is a schematic flow diagram through the water treatment plant of the present invention during backwashing thereof.

DETAILED DESCRIPTION

Referring to the drawings and in particular to FIGS. 1–3, the present invention is illustrated in the form of a package water treatment plant 10, having side walls 11 and partitions 12 fabricated of sheet metal. Raw water is delivered to the plant 10 through a pipe 13 by a pump (not shown) or by gravity head. Means are provided for adding treatment chemicals, and which may be chemicals to assist in the removal of such undesired materials as manganese or iron or chemicals for reducing hardness or the usual chemicals for forming flocs to assist in removal of suspended and colloidal materials. In the illustrated embodiment a coagulating chemical from a storage tank 14, preferably aluminum sulfate, a settling and filtering aid from a storage tank 16, preferably an organic polyelectrolyte, and a chlorine solution from a storage tank 18 for disinfection are added by chemical feed pumps 19, 20 and 21 through pipes 22, 23 and 24, respectively, as shown in FIG. 1, and are allowed to mix in the influent pipe 13 prior to entering the plant 10. Suitable controls for the plant 10 are located in panels 26 and 28.

The thus chemically treated raw water is introduced into a chamber 30 containing granular limestone or calcite through a pipe 32 extending downwardly into the chamber. The water is discharged from the bottom of the pipe 32 and flows upwardly through the alkaline material in the chamber. Flow through the pipe 32 and thus into the chamber 30 is controlled by a valve 34 operated by a float 36. The mesh size of the granules of limestone or calcite and the surface area of the chamber 30 itself are preferably selected such that the velocity of the influent therethrough will cause complete and random movement of all the particles therein, that is, complete fluidization thereof. It is essential to the successful performance of the calcite or limestone bed that such things as needles, twigs and leaves be passed therethrough without causing any stoppage of flow. By maintaining fluidization of the granular bed, stoppage by the debris present in unfiltered waters is prevented. The flow rate is controlled so that the water spends sufficient time in the chamber 30 to buffer the acid produced by the coagulating chemicals above described, less than five minutes ordinarily being sufficient. Alkalinity (pH control) is thereby automatically provided for.

The water which has been coagulated and buffered by passing upwardly through the limestone or calcite bed in the chamber 30 exits therefrom by overflowing at the surface thereof into a flocculation basin 40 through a rectangular weir 42 which serves as a means of measuring and controlling the plant flow rate. The influent is first agitated in the upper portion of the flocculation basin 40 and then passes through openings in the center of a separation baffle 44 located at the mid-depth of the basin, into the lower portion thereof for final agitation. Mixing and turbulence is imparted to the water by an agitator 46 (see FIG. 3) consisting of a plurality of vertical paddles 48 attached to horizontal arms 50 on a galvanized pipe shaft 52 which rotates in a guide bearing 54 at the bottom of the basin 40. Fixed stator blades 55 attached to the baffle 44 are provided to increase turbulence. The shaft 52 is turned by a fractional horsepower gear head motor 56 supported by a beam 58 across the basin 40 and adapted to provide an angular velocity to the agitator 46 sufficient to promote a growth of floc. The turbulence produced by the paddles 48 and blades 55 aids in agglomerating the flocculated turbidity particles and increasing their mass, and hence, their settling velocity.

The flocculated water then flows from a point near the bottom corner of the flocculation basin 40 vertically through a triangular passageway 60 to a point just below the normal water level in the plant and passes over a submerged weir 62 into a receiving plenum 68 of a settling basin 70 comprising a plurality of generally horizontally extending settling tubes 72 connected at one end to the plenum 68 and sufficient in number such that the entire flow through the plant passes through the tubes at a velocity therein such that the Reynolds number does not exceed 100 whereby the water passes through the tubes in substantially streamline flow to permit the majority of the suspended matter to be removed therein by gravity separation. The tubes 72 are of a length (about three to six feet) that passage time therethrough is between about five to ten minutes and they are slightly elevated in the direction of flow therethrough and are more particularly described in patent application Ser. No. 553,401, filed May 27, 1966, entitled Settling Apparatus, and now abandoned. This short settlement time of five to ten minutes is in contrast to most water treatment plants where settlement requirements are satisfied only by long periods of quiescence in large tanks requiring, for example, 30 minutes to an hour.

The clarified effluent from the settling tubes 72 discharges from the ends thereof into a common plenum 74 from which the effluent is allowed to spill over a weir 76 into a chamber 78 containing a filter 80.

The filter 80 preferably comprises filter media of coarse to fine particle gradation in the direction of liquid flow. Such a filter may comprise more or less discrete layers of materials of suitable size and density such that upon backwashing the filter particles will re-deposit in their desired orientation. Such a filter may, for example, comprise an upper layer of anthracite coal having a density of about 1.55 and a particle size of between about −8 and +20 U.S. mesh. Such layer may have a depth of between about 20 to 36 inches. The bed may comprise a lower layer of relatively dense material such as silica sand of between −20 and +60 U.S. mesh, such layer having a depth of between about 3½ to 12 inches. More preferably the filter comprises a bed having intermixed media wherein there is an increasing number of particles per given cross-section in the direction of flow. The coarse particles of filter media predominate near the top of the filter 80, the medium size particles predominate in the center region thereof, and the finer particles predominate in the lower region thereof, all as more particularly described in patent application Ser. No. 345,204, filed Feb. 17, 1964, and now Patent No. 3,343,680 entitled Filter and Method of Making Same. The size of particles in a filter 80 of the type described in such application will preferably range from 0.1 mm. to 1.5 mm. The filter media is supported within the chamber 78 on a layer of porous Carborundum plates 82 (see FIG. 4). The filter 80 separates from the water the residual particulate matter, or floc, which is not removed in the settling tubes 72, as it passes therethrough, the floc being entrapped in the media thereof.

Filtered water collects in a plenum chamber 84 beneath the supporting Carborundum plates 82 and is removed by a centrifugal pump 86, being discharged into a backwash storage tank 88. A throttling valve 90 on the pump at discharge line 91 and operated by a float 92 is provided to balance the flow rate from the filter 80 with that of the incoming raw water. The throttling action of the valve 90 on the pump 86 results in maintaining the flow rate through the filter equal to the influent flow rate. A gravity line 93 from the backwash storage tank 88 leads to a clearwell tank (not shown) of any desired size, from which a line is provided to the consumer.

A turbidimeter 94 in communication with the pump discharge line 91 is provided to prevent discharge of filtered water having a turbidity in excess of 1 Jackson Turbidity Unit (J.T.U., as described in "Standard Methods for the Examination of Water and Waste Water," American Public Health Association, 12th ed., 1965). The turbidimeter 94 continuously monitors the turbidity of the water being discharged from the plant 10 and is set to terminate operation of the plant at the maximum permissible turbidity level above mentioned by suitable conventional controls arranged to terminate flow of raw water into the plant and to shut off the chemical feed pumps 19, 20, 21 and pump 86. The use of the turbidimeter thus eliminates all possibilities of exporting inferior quality filtered water during periods of plant malfunction.

The operation of the treatment plant of the present invention results, of course, in the filter 80 becoming laden with solids and the settling tubes 72 having their storage capacity filled. When the filter becomes clogged, the head loss increases therethrough and, consequently, the water level 96 rises thereover. As the water level 96 rises, the valve 90 opens to decrease the throttling action and allow the filter pump 86 to discharge water at a rate which ultimately equals the rate of the incoming flow. Eventually, however, the head loss through the filter bed 80 and, consequently, the level 96 of the water thereover, reaches a point where the pump 86 cannot remove the filtered water at a rate equal to that of the incoming raw water. At this point, cleansing of the filter bed 80 by backwashing is necessary.

Furthermore, periodic removal of the material deposited in the settling tubes 72 is required, since a build-up of material will impair their storage capacity. Also, the accumulation of sludge and the resultant septic conditions which might develop could cause taste and odor problems in the finished water. Thus, adequate periodic cleaning of the settling tubes 72 is also mandatory.

The backwash sequence preferably is initiated at a predetermined head loss value through the filter which head loss can be detected either by measuring the increase in the water level 96 over the filter 80 or by measuring the reduced pressure in the plenum chamber 84 below the filter.

In the backwash sequence (see FIG. 5), a backwash pump 100 draws filtered water from the backwash storage tank 88 through a line 102 and passes it in the direction reverse to filtration up through the filter bed 80 at a velocity sufficient to fluidize the particles therein, thereby to scour the bed and wash the captured solid material therefrom. During the backwashing of the filter 80, the water level 104 rises and achieves a common level in both the filter chamber 78 and the settling basin 70. The rise in this water level continues until a siphon pipe 110 joining the plenum 68 of the basin 70 to a waste connection (not shown) is primed. The siphon pipe 110 is sized to evacuate the entire contents of the settling basin 70 in a period of between one and two minutes. As the water level in the plenum 68 drops below the level of the tubes 72 each will drain into the plenum and because of the downward slope of each tube, the settled material in the bottom of the tubes will flow into the plenum 68 and be carried out through the siphon. Thus, during the backwash sequence the filter bed 80 is fluidized, scoured and washed as above mentioned, and at the same time the sludge captured in the settling tubes 72 is discharged along with the backwash water to waste. As the siphon pipe 110 removes the water from the settling basin 70, the water level 104 lowers and the flow through the siphon decreases until the inlet end 112 is opened to the atmosphere, thereby to cause the siphoning action to cease. After the siphoning action is thus broken, the settling basin 70 is again filled with backwash water so that the cycle can be repeated a second time.

A valve 114 (FIG. 1) operated by suitable controls is provided on the siphon pipe 110 to vent the pipe to the atmosphere at a pre-set time near the end of the backwash cycle, thereby to prevent the siphon pipe 110 from being reprimed a third time. The valve 114 thus insures that at the completion of the filter backwash sequence the settling basin 70 will be filled with backwash water. This feature is desirable for a number of reasons. First of all, it permits the plant to return to the production of filtered water immediately upon completion of the backwash sequence, thereby to eliminate a waiting period of between 7 and 10 minutes duration which would otherwise be necessary while the basin 70 was being filled with incoming coagulated but unfiltered water. Secondly, use of the valve 114 conserves backwash water which would otherwise be discharged to waste, thereby resulting in a considerable economic saving.

A third advantage which accrues through use of the valve 114 concerns the effect on the efficiency of the settling tubes 72 in removing coagulated and flocculated turbidity. As previously described, the raw water that has passed through the flocculation basin 40 enters the settling basin 70 by passing over a submerged weir 62 positioned just beneath the normal operating water level therein. If the settling basin 70 were empty at the end of the backwash cycle, the newly flocculated incoming water would have to cascade over the weir 62 and fall to the bottom of the plenum 68. If this were to occur, the floc formed during mechanical agitation would be destroyed. It has been found experimentally that for a period lasting between 5 and 10 minutes after the settling basin 70 has been filled with incoming water in this manner, that is, by cascading over the weir 62, that the settling tubes 72 remove only a very small percentage of the turbidity therein until the water entering the settling basin is prevented from undergoing excessive turbulence during its passage from the flocculation basin 40 to the settling basin 70. Thus, use of the valve 114 to terminate the backwash cycle with the settling basin full of backwash water avoids these problems and permits the settling tubes 72 to function at peak efficiency immediately upon resumption of water treatment.

As indicated earlier, the apparatus of the invention may be utilized in the treatment of water to remove iron and manganese values therefrom or to remove hardness imparting materials.

We claim:

1. A water treatment plant comprising a rectangular container;
   wall means defining a first chamber in said container;
   a quantity of divided alkaline material in said first chamber;
   inlet means to introduce raw water to the bottom of said first chamber;
   wall means defining a flocculation basin in said container adjacent said first chamber, said first chamber and said flocculation basin having a first common wall;
   an agitator in said flocculation basin;
   wall means defining a settling basin in said container adjacent said flocculation basin;
   said settling and flocculation basins having a second common wall;
   a first weir at the top of said first common wall and over which said first weir flows water passing upwardly through said first chamber;
   means including a second weir for conveying water from said flocculation basin to said settling basin;
   said settling basin comprising a pair of horizontally spaced plenums and a plurality of generally horizontally extending settling tubes extending between said plenums, one of said plenums being adjacent said second common wall for receiving water from said flocculating basin;
   said tubes having a total cross sectional area such that for a predetermined maximum flow rate through the plant the velocity through each tube will be such as to maintain streamline flow therein whereby settleable material in the water entering said tubes may settle out of said water and deposit upon the bottom of said tubes as it passes therethrough from said one plenum to the other of said plenums;
   a filter in said container adjacent said settling basin, comprising wall means defining a chamber and media within said filter chamber of lesser depth than the depth of said filter chamber;
   means for conveying water from said other plenum to said filter chamber;
   and a tank in communication with said filter for receiving water passing therethrough.

2. A water treatment plant as in claim 1 further comprising a first float disposed in said first chamber and a first valve in said inlet means responsive to the level of said first float for regulating the flow of raw water into said container.

3. A water treatment plant as in claim 1 further comprising means defining a vertical passageway in communication with the bottom of said flocculation basin for conveying water passing therethrough to said second weir.

4. A water treatment plant as in claim 1 further comprising a float disposed in said filter chamber above said filter media;
   and a valve in the outlet of said filter chamber responsive to the level of said float for regulating the flow of water through said filter and maintaining the same substantially equal to the rate of flow of raw water into said chamber.

5. A water treatment plant as in claim 1 further comprising a turbidimeter for detecting the turbidity of the effluent from said filter.

6. A water treatment plant as in claim 1 further comprising a backwash pump connected between the bottom of said filter chamber and said tank for pumping water from said tank back through said filter and said settling basin.

7. A water treatment plant as in claim 1 further comprising means responsive to the pressure loss through said filter for generating a signal,
   and means responsive to said signal for starting said backwash pump.

8. A water treatment plant as in claim 1 wherein said filter media is arranged in said chamber with coarse to fine particle gradation in the direction of fluid flow.

9. A water treatment plant as in claim 6 further comprising a siphon in said one settling basin plenum and adapted to become primed and evacuate water from said settling basin and said filter when water rises to a predetermined common level above said settling basin and said filter.

10. A water treatment plant as in claim 6 including,
    water removal means for removing water from said one plenum at a faster rate than the rate water is pumped by said backwash pump,
    means for initiating operation of said water removal means upon initiation of operation of said backwash pump, and means for terminating operation of said water removal means prior to termination of operation of said backwash pump whereby said plenum may be refilled with backwash water.

11. A water treatment plant as in claim 9 further comprising a vent means in said siphon to break the siphon action;

and timer means connected to said vent means for opening the same a pre-determined period of time after commencement of a backwash cycle.

References Cited

UNITED STATES PATENTS

| | | | |
|---|---|---|---|
| 1,433,357 | 10/1922 | Ellis | 210—265 X |
| 1,732,386 | 10/1929 | Sprockhoff | 210—521 X |
| 1,743,026 | 1/1930 | Daniels | 210—251 |
| 2,274,953 | 3/1942 | Downes | 210—521 X |
| 3,097,163 | 7/1963 | Riddick | 210—53 |
| 3,262,878 | 7/1966 | Beckley et al. | 210—53 |
| 3,343,680 | 9/1967 | Rice et al. | 210—263 |

REUBEN FRIEDMAN, Primary Examiner

T. A. GRANGER, Assistant Examiner

U.S. Cl. X.R.

210—104, 124, 257